(12) United States Patent
Lumb et al.

(10) Patent No.: US 7,917,903 B2
(45) Date of Patent: Mar. 29, 2011

(54) QUALITY OF SERVICE CONTROLLER AND METHOD FOR A DATA STORAGE SYSTEM

(75) Inventors: Christopher Lumb, Pittsburgh, PA (US); Arif Merchant, Los Altos, CA (US); Guillermo Alvarez, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2569 days.

(21) Appl. No.: 10/400,556

(22) Filed: Mar. 27, 2003

(65) Prior Publication Data

US 2004/0194095 A1 Sep. 30, 2004

(51) Int. Cl.
*G06F 9/46* (2006.01)
(52) U.S. Cl. .................... 718/100
(58) Field of Classification Search .......... 718/100–102; 709/230, 226; 370/411–412, 395.42
See application file for complete search history.

(56) References Cited

U.S. PATENT DOCUMENTS

| | | | |
|---|---|---|---|
| 5,239,659 A | 8/1993 | Rudeseal et al. | |
| 5,426,736 A | 6/1995 | Guineau, III | |
| 5,459,857 A | 10/1995 | Ludlum et al. | |
| 5,680,539 A | 10/1997 | Jones | |
| 6,078,998 A * | 6/2000 | Kamel et al. | 711/151 |
| 6,157,963 A | 12/2000 | Courtright et al. | |
| 6,170,042 B1 | 1/2001 | Gaertner et al. | |
| 6,434,631 B1 | 8/2002 | Gabber et al. | |
| 6,738,386 B1 * | 5/2004 | Holmqvist | 370/412 |
| 6,862,623 B1 * | 3/2005 | Odhner et al. | 709/226 |
| 6,970,936 B2 * | 11/2005 | Fields et al. | 709/230 |
| 7,093,256 B2 * | 8/2006 | Bloks | 718/102 |
| 7,783,787 B1 * | 8/2010 | DeBergalis et al. | 710/1 |
| 2002/0150115 A1 * | 10/2002 | Onvural et al. | 370/411 |
| 2003/0227926 A1 * | 12/2003 | Ramamurthy et al. | 370/395.42 |

OTHER PUBLICATIONS

I. A. Pratt, "User-Safe Devices for True End-to-End QoS", Proceedings of the IEEE 7th International Workshop on Network and Operating System Support for Digital Audio and Video, May 19-21, 1997, St. Louis, MO. New York: IEEE, 1997.

Lan Huang. "Stonehenge: A High Performance Virtualized Storage Cluster with QoS Guarantees." Thesis Proposal. Stony Brook: Computer Science Department, SUNY at Stony Brook, Jan. 2002.

(Continued)

*Primary Examiner* — Meng-Ai An
*Assistant Examiner* — Eric C Wai (57) ABSTRACT

A quality-of-service controller and related method for a data storage system. Requests for each of a plurality of storage system workloads are prioritized. The requests are selectively forwarded to a storage device queue according to their priorities so as to maintain the device queue at a target queue depth. The target queue depth is adjusted response to a latency value for the requests wherein the latency value is computed based on a difference between an arrival time and a completion time of the requests for each workload. Prioritizing the requests may be accomplished by computing a target deadline for a request based on a monitored arrival time of the request and a target latency for its workload. To reduce latencies, the target queue depth may be reduced when the target latency for a workload is less than its computed latency value. To increase throughput, the target queue depth may be increased when the target latency for each workload is greater than each computed latency value.

40 Claims, 4 Drawing Sheets

OTHER PUBLICATIONS

Prashant J. Shenoy and Harrick M. Vin, "Cello: A Disk Scheduling Framework for Next Generation Operating Systems." SIGMETRICS '98/Performance '98 Joint International Conference on Measurement and Modeling of Computer Systems : proceedings; Jun. 22-26, 1998, Madison, Wisconsin. New York: Association for Computing Machinery, NY, 1998.

Kartik Gopalan and Tzi-cker Chiueh. "Multi-Resource Allocation and Scheduling for Periodic Soft Real-Time Applications." Proceedings of SPIE vol. 4673 Multimedia Computing and Networking 2002 (MMCN2002) San Jose, CA. Bellingham: SPIE, 2002. pp. 34-45.

John Wilkes. "Traveling to Rome: QoS specifications for automated storage system management." Proceedings 9th International Workshop on Quality of Service (IWQoS' 2001) (Jun. 6-8, 2001, Karlsruhe, Germany). Eds. L. Wolf, D. Hutchinson. R. Steinmetz. Berlin, Germany: Springer-Verlag, 2001. pp. 75-91.

Tzi-cker Chiueh, Lan Huang, Gang Peng. "Stonehenge: A High Performance Virtualized Network Storage Cluster with QoS Guarantees". Stony Brook: Computer Science Department, SUNY of Stony Brook, Jan. 27, 2002. < http://www.ecsl.cs.sunysb.edu/stonehenge/> .

* cited by examiner

QUALITY OF SERVICE CONTROLLER AND METHOD FOR A DATA STORAGE SYSTEM

This application is related to U.S. application Ser. No. 10/400,232, filed Mar. 27, 2003, and entitled, "Data Storage System Emulation," the contents of which are hereby incorporated by reference.

BACKGROUND OF THE INVENTION

The present invention relates to data storage systems. More particularly, the present invention relates to control of data storage systems for quality-of-service (QoS).

Due to such factors as advances in technology, reductions in computer hardware costs and growth of the World Wide Web, increasing quantities of digital data are being generated worldwide. For example, computer systems in businesses, government and homes are used to generate data in the form of text and other documents, databases, multi-media files, e-mail correspondence, web pages, transaction records, and so forth. As a result, data storage demands are enormous and are growing over time.

Driven by this increasing demand, data storage systems are becoming larger and more complex. For example, a modern data center may include tens of large arrays and thousands of logical volumes and file systems. Such a data center may serve the storage demands of a large organization or even multiple organizations.

Increasingly, organizations outsource their data storage and management needs to a storage service provider (SSP). The SSP allocates storage on its own disk arrays that it makes available to its customers. While an organization may serve its storage needs internally, by purchasing equipment and hiring appropriate personnel, the organization may also internally follow an SSP model for providing storage services to its separate divisions.

It would be desirable to be able to specify the level of service that each customer will receive, for example, in terms of capacity, availability and performance level. This can be difficult in the context of an SSP, however, because each customer presents an independent load to the SSP that competes for storage resources, such as cache space, disk, bus, and network bandwidth and process cycles of a storage controller. Further, storage systems are typically designed to provide best efforts service for all requests, regardless of their origin.

One approach for attempting to ensure that each workload receives adequate service is to over-provision the storage system with excess capacity and bandwidth. However, this technique is not generally cost-effective since the additional resources add to the cost of the system. Another approach is to assign separate physical resources (e.g., one or more dedicated disk arrays) to each workload. This technique tends to be inflexible in that additional capacity or bandwidth cannot generally be added in arbitrary increments and, instead, extensive reconfiguring may be required when the workload's requirements change.

Therefore, what is needed is an improved ability to specify the service level that a particular workload will receive from a storage system that handles multiple workloads. It is to this end that the present invention is directed.

SUMMARY OF THE INVENTION

The invention is a quality-of-service controller and related method for a data storage system. In one aspect, the invention provides a quality-of-service method and apparatus for data storage. Requests for each of a plurality of storage system workloads are prioritized. The requests are selectively forwarded to a storage device queue according to their priorities so as to maintain the device queue at a target queue depth. The target queue depth is adjusted response to a latency value for the requests wherein the latency value is computed based on a difference between an arrival time and a completion time of the requests for each workload.

Prioritizing the requests may be accomplished by computing a target deadline for a request based on a monitored arrival time of the request and a target latency for the workload. The target latency for a workload may be based on the request rate for the workload. To reduce latencies, the target queue depth may be reduced when the target latency for a workload is less than its computed latency value. To increase throughput, the target queue depth may be increased when the target latency for each workload is greater than each computed latency value. The device queue has an attained queue depth as of result of said forwarding requests to the device queue. Thus, increasing the target queue depth value may be performed when the attained queue depth is limited by the target queue depth.

In another aspect, a function specifies an allowable latency statistic for each of a plurality of workloads where each workload included a plurality of requests. The requests are scheduled and forwarded to a data storage device for substantially maintaining a monitored latency statistic within the allowable latency statistic for each workload. The requests may be scheduled by prioritizing the requests according to a target deadline for each request. The requests may be forwarded so as to maintain a target queue depth at the data storage device. The target queue depth may be reduced when the allowable latency statistic for the workload is less than the monitored latency statistic. Further, the target queue depth may be increased when each allowable latency statistic is greater than each monitored latency statistic.

These and other aspects of the invention are described in more detail herein.

DETAILED DESCRIPTION OF A PREFERRED EMBODIMENT

The present invention provides a quality of service controller and related method for a data storage system. The invention adds a level of virtualization between one or more hosts and one or more storage devices by intercepting input/output (I/O) requests from the hosts and forwarding them to the storage devices while selectively throttling the rate at which they are forwarded. Each request is scheduled for delivery to the storage devices, while its completion is monitored. Based on statistical information obtained from completed requests, the scheduling may then be altered in an attempt to maintain desired performance for each workload. The invention provides a degree of performance isolation, in which the performance experienced by a workload is less affected by variations in the other workloads, and better ensures that performance objectives are satisfied. By balancing multiple workloads among the storage resources, efficient use is made of the resources.

Figure 1:
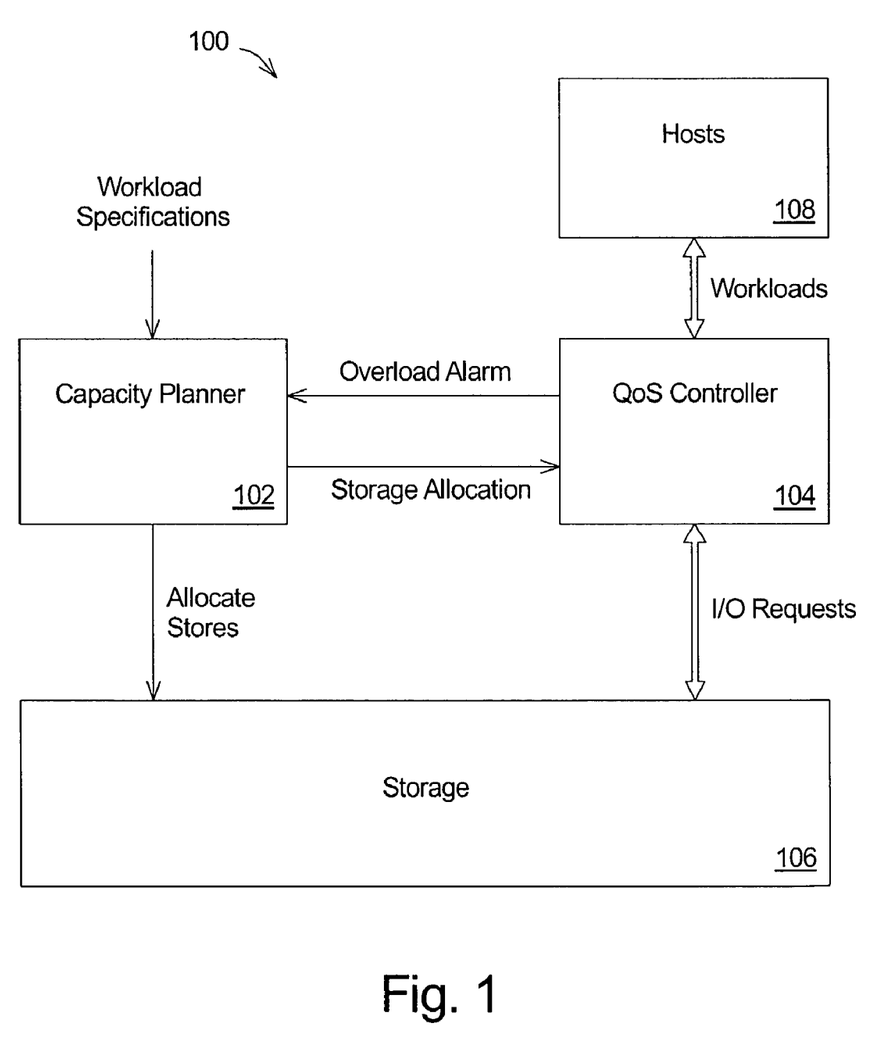
FIG. 1 illustrates a data storage management system according to an aspect of the invention.

FIG. 1 illustrates a data storage management system 100 according to an aspect of the invention. The system 100 includes a capacity planner 102, a quality-of-service controller 104 and storage device(s) 106, such as one or more hard disk arrays.

The capacity planner 102 receives as input a specification of one or more workloads. For example, a system administrator may provide this input. The workload specification may include, for example, a number of stores (i.e. virtualized storage space) required by each workload and the capacity (i.e. the amount of storage space) required by each workload. In addition, performance objectives for the workloads, such as allowable I/O request latencies based on the rate of request generation, may be input to the system 100. The capacity planner 102 allocates storage for each workload on the storage device 106 by assigning the stores to the devices 106 and also ensures that the devices 106 have sufficient capacity and bandwidth to meet the aggregate demands of the workloads. This allocation may be changed periodically to meet changing requirements of the workloads and changes to configurations of the devices 106. The capacity planner 102 may be implemented as a general-purpose computer system programmed to perform the capacity planning steps. The physical configuration of the devices 106 indicated by the capacity planner may be performed, for example, by the system administrator.

In one aspect, the capacity planner 102 operates in accordance with U.S. patent application Ser. No. 10/046,463, filed Oct. 23, 2001 and entitled, "Automated System Adaptation Technique Particularly for Data Storage Systems," the contents of which are hereby incorporated by reference. For this planner 102, a sequence of steps is performed in an iterative loop, including analyzing the operation of the storage devices 106 under the workloads, generating a new design based on the analysis and migrating the existing system to the new design. By programmatically repeating these tasks, the capacity plan converges to one that supports the workload without being over-provisioned.

In another aspect, the capacity planner 102 operates in accordance with U.S. patent application Ser. No. 09/924,735, filed Aug. 7, 2001 and entitled, "Simultaneous Array Configuration and Store Assignment for a Data Storage System," the contents of which are hereby incorporated by reference. For this planner 102, a data structure having a plurality of nodes is stored in a computer-readable memory. At least some of the nodes correspond to the physical data storage devices 106 having respective attributes. A plurality of data stores to be used by the workloads each have data storage requirements, such as capacity and bandwidth requirements, that are provided as input. The data stores are assigned recursively into the hierarchy, checking at each node that none of the attributes are exceeded by the requirements of the store. While the stores are assigned, the hierarchy may be modified to better accommodate the stores. The possible assignments which to not violate any attributes may be compared to each other according to goals of the system.

The above-described capacity planners 102 for use in the system 100 of FIG. 1 are exemplary. As such, it will be apparent that another planner may be selected. Further, the capacity planning may be performed in accordance with conventional manual techniques.

Host systems 108 may include, for example, computer systems on which one or more applications are running where the applications generate I/O requests (i.e. read and write operations) to the storage devices 106. Each workload includes a series of I/O requests generated by one or more hosts 108 and/or an application running on one or more hosts 108. For example, a particular workload may consist of all of the requests generated by a single one of the hosts 108 or by a particular application running on several of the hosts 108. As another example, the requests generated by a host or an application may be divided into read and write requests, where the read requests represent one workload and the write requests represent another workload.

The quality-of-service controller 104 receives the I/O requests generated by the one or more host systems 108. In response, the controller 104 communicates with the storage devices 106 to complete the requests. In addition, the controller 104 may receive storage allocation information from the capacity planner 102 which the controller 104 may use to identify the particular workload to which each request belongs. If the controller 104 is unable to meet performance objectives for the workloads, the controller 104 may signal the capacity planner 102, such as by communicating an overload alarm. When this occurs, the capacity planner 102 may take appropriate action, such as by re-allocating stores to devices 106, exchanging the devices 106 with others that have more capacity and/or bandwidth or by increasing the number of devices 106 or components thereof to increase the overall capacity and/or bandwidth of the devices 106.

Figure 2A:
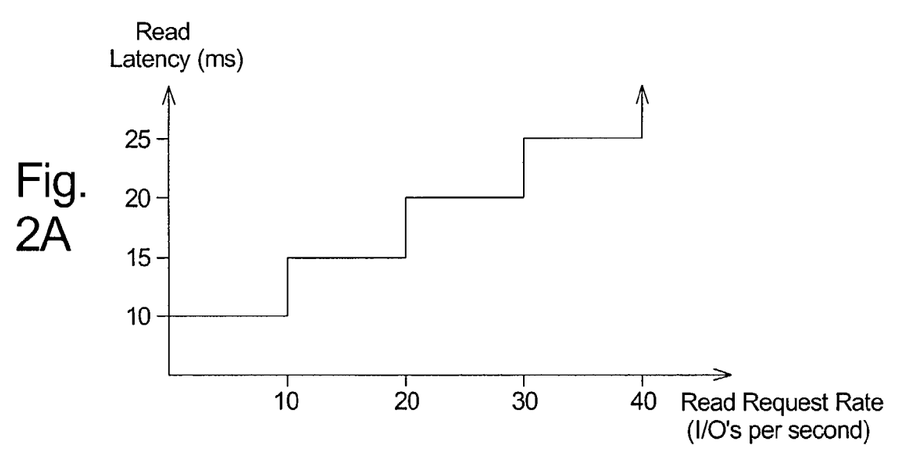
FIGS. 2A and 2B illustrate exemplary performance requirements for a workload.
Figure 2B:
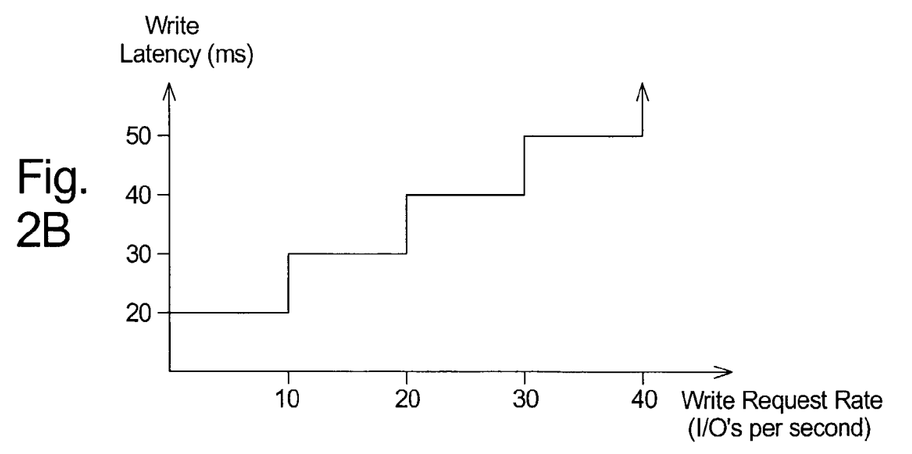

The performance objectives for each workload may be specified by a pair of curves, one each for specifying read and write latency as a function of offered request rate, averaged during a time window w. FIGS. 2A and 2B illustrate exemplary performance requirements for a workload. More particularly, FIG. 2A shows a graph with a rate of issuance of read requests, in I/O's per second, on the horizontal axis and a not-to-exceed maximum latency in milliseconds (averaged during a period w) on the vertical axis. Latency is the time required to process a given request, which may be measured as the amount of time elapsed between the controller 104 receiving the request from a host 108 and the storage device 106 completing the request. As shown in FIG. 2A, for read request rates below 10 I/O's per second, a maximum latency of 10 ms is allowed. For read request rates between 10 and 20 I/O's per second, a maximum latency of 15 ms is allowed and for read request rates between 20 and 30 I/O's per second, a maximum latency of 20 ms is allowed. In addition, for read request rates between 30 and 40 I/O's per second, a maximum latency of 25 ms is allowed. While not required, no limit is placed on latency for I/O request rates beyond 40 I/O's per second.

Figure 3:
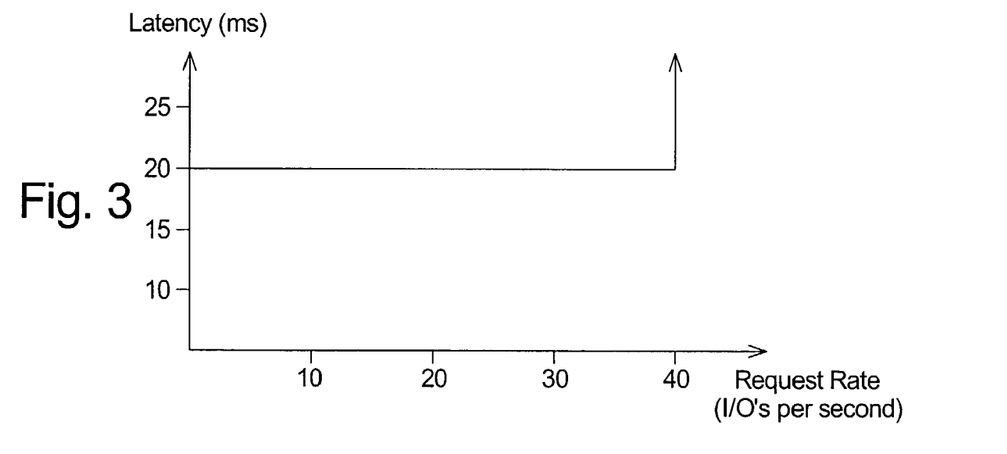
FIG. 3 illustrates alternate exemplary performance requirements in which a single latency limit applies to all request rates below a threshold.

FIG. 2B shows a graph of latency limits for write requests. As shown in FIG. 2B, for write request rates below 10 I/O's per second, a maximum latency of 20 ms is allowed. For write request rates between 10 and 20 I/O's per second, a maximum latency of 30 ms is allowed and for request rates between 20 and 30 I/O's per second, a maximum latency of 40 ms is allowed. In addition, for write request rates between 30 and 40 I/O's per second, a maximum latency of 50 ms is allowed. Similarly, to FIG. 2A, no limit is placed on latency for I/O request rates beyond 40 I/O's per second. While the performance requirements illustrated in FIGS. 2A and 2B differ for read requests and write requests, it will be apparent that the same requirements may apply to both. Further, there can be fewer or more latency limits specified. For example, FIG. 3 shows a graph in which a single latency limit of 20 ms applies to all request rates below 40 I/O's per second.

In general, these two curves can be represented as a vector of triples: $((r_1, tr_1, tw_1), (r_2, tr_2, tw_2), \ldots, (r_n, tr_n, tw_n))$, where $0 < r_1 < \ldots < r_n$ and where r is the request rate, tr is the maximum latency for read requests and tw is the maximum latency for write requests. Because no limit is placed on latency for request rates beyond $r_n$, this can be expressed as: $tr_{n+1} = tw_{n+1} = \infty$. Thus, the curves of FIGS. 2A and 2B can be expressed as: ((10 IO/s, 10 ms, 20 ms), (20 IO/s, 15 ms, 30 ms) (30 IO/s, 20 ms, 40 ms), (40 IO/s, 25 ms, 50 ms)).

Time may be divided into windows (epochs) of w. Each window w may be on the order of one second, though another window length may be selected. Thus, to determine whether the maximum latency is exceeded, measured latencies are averaged over a time period of w. Thus, for a workload with a fraction fr of the total I/O requests being read requests to meet the performance requirements, the average latency over any time window $w_i$ should not exceed $fr*tr_i+(1-fr)tw_i$ where the average request rate over the previous window w is less than $r_i$. This formula implies a latency bound of $tr_i$ for read-only workloads, $tw_i$ for write-only workloads, and a linear interpolation between the two bounds for mixed read/write workloads. However, it is not necessary to combine measured latencies in this manner. For example, throttling of requests could be based on observed read latencies only or on observed write latencies only, particularly where a workload is dominated by one or the other. Also, where latency objectives are the same for read and for write requests, there would not be a need to distinguish between latencies observed for each.

In general, the performance objective for a workload may be any computable function that specifies the latency required, based on any set of measurable characteristics of the workload. For example, the latency may be specified as a function of I/O size, or a combination of I/O size and whether the requests are read or write. The function may be a mathematical function or, as in this case, specified by a table. While the performance objectives for reads and writes are combined into a single objective function here, they may also be kept separate. For example, read requests and write requests from a workload may be placed into separate input queues and separate latency bounds may be associated with each. Similarly, requests may be separated into separate input queues based on other criteria. For example, if the performance objective specifies separate latency functions for small I/Os (e.g., less that 64 KB) and large I/Os (e.g., greater than or equal to 64 KB), then large and small I/O requests may be separated into separate input queues and the corresponding performance requirements applied to them separately, thereby treating them as separate workloads.

Figure 4:
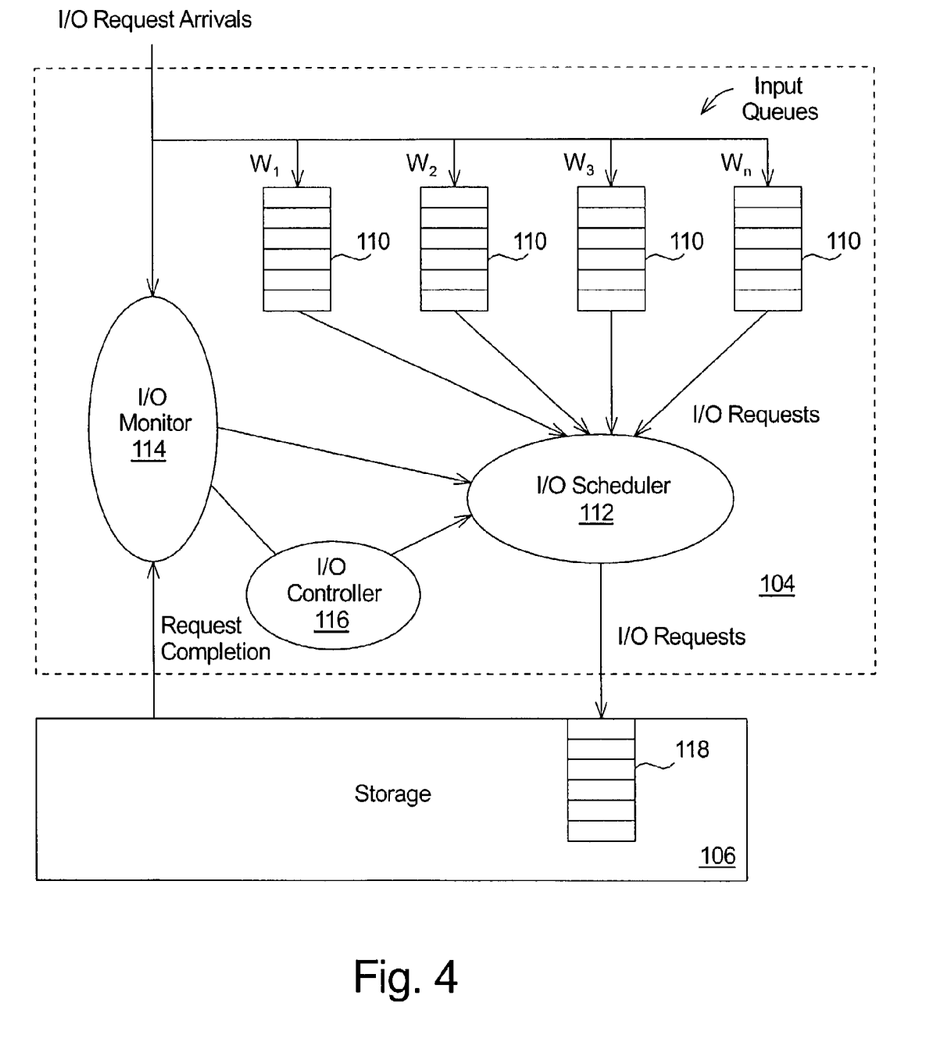
FIG. 4 illustrates a quality-of-service storage controller according to an aspect of the invention.

FIG. 4 illustrates an embodiment of the quality-of-service storage controller 104 of FIG. 1 in more detail. The controller 104 includes input queues 110, an I/O scheduler 112, an I/O monitor 114 and an I/O controller 116. The queues 110 may be implemented by memory devices configured as buffers, while the scheduler 112, monitor 114 and controller 116 may be implemented by general or special-purpose hardware and/or software.

FIG. 4 also illustrates a device queue 118 which is conventionally part of a storage system and is, thus, included in devices 106. In absence of the QoS controller 104, requests would be unintelligently delivered directly to the device queue 118 from the hosts 108. Removal of requests from device queue 118 and sorting of requests within the device queue 118 may be under control of the devices 106 and, thus, the device queue 118 operates independently of the QoS controller 104. For example, a typical storage device (that may be used in the devices 106) may implement a scheme for sorting requests among those in the device queue 118 that is proprietary to the manufacturer of the device. Thus, the invention is compatible with commercially available storage devices. However, the QoS controller 104 controls the flow of requests to the device queue 118.

Requests arriving at the QoS controller 104 (e.g., from hosts 108) are queued in the input queues 110 where the requests from each workload are preferably assigned to a particular one of the queues 110. Based on repeated input from the I/O monitor 114 and the I/O controller 116, the scheduler 112 maintains a target queue depth value for the device queue 118 and per-workload latency targets which the scheduler 112 attempts to maintain.

The scheduler 112 prioritizes the requests for each workload against the other requests in the same workload. This may be accomplished using earliest deadline first (EDF) scheduling in which the deadline for a request from a workload $W_k$ is computed as the arrival time arrivalTime($W_k$) of the request plus the latency target for the workload latencyTarget($W_k$). Thus, the deadline for a request from workload $W_k$ can be computed as arrivalTime($W_k$)+latencyTarget($W_k$). The deadline for a workload is considered to be the same as the oldest pending request in the workload.

The scheduler 112 polls the device queue 118 repeatedly to determine a then-current queue depth (i.e. the number of requests pending in the queue 118). Alternately, the scheduler 112 may compute the current device queue depth based on I/O request arrival and completion information from the monitor 114, for example, where the device 106 does not support reporting of the depth of the device queue 118. Preferably, the queue depth is polled periodically (e.g., every 1 ms) and also upon completions of I/O requests. Requests from a workload are forwarded to the device queue 118 under specified circumstances: A request may be forwarded to the device queue 118 when the current depth of the device queue 118 is less than the target specified by the I/O controller 116. In this case, the scheduler 112 selects the workload with the earliest deadline and forwards the first request (i.e. the request having the earliest deadline) in its corresponding queue 110 to the device queue 118. The scheduler 112 repeats these steps of selecting a workload with the next earliest deadline and forwarding the first request of that workload to the device queue 118 until the current depth of the device queue 118 reaches the target depth. Thus, the requests are prioritized in the input queues 110 and a highest priority one of the requests is forwarded to the device queue 118 so as to maintain the device queue 118 at its target depth. A request may also be forwarded to the device queue 118 when its deadline has already passed. All past-due requests are preferably forwarded to the device queue 118 even if this causes the depth of the device queue 118 to exceed its target depth. This allows newly-arrived requests for workloads with low latency requirements to be immediately served.

The I/O monitor 114 monitors I/O request arrivals and completions. More particularly, the monitor 114 may monitor the rate of arrival at the QoS controller 104 of new read and write requests for each workload and also report this information to the I/O controller 116. Recall that the performance objective may specify a maximum latency based on the request rates. Accordingly, the target latency for each workload may be determined periodically based on the then-current request rates. More particularly, where the performance objectives are given as $((r_1, tr_1, tw_1), (r_2, tr_2, tw_2), \ldots, (r_n, tr_n, tw_n))$, the latency target for a workload $W_k$ that includes read and write requests may be computed as follows:

$$\text{latencyTarget}(W_k) = fr*tr_i + (1-fr)tw_i, \text{ if } r_{i-1} \leq \text{readRate}(W_k) + \text{writeRate}(W_k) < r_i$$

where readRate($W_k$) is the read request rate for the workload $W_k$, writeRate($W_k$) is the write request rate for the workload $W_k$, and $r_0=0$, $r_{n+1}=\infty$, $tr_{n+1}=tw_{n+1}=\infty$. The targets are preferably determined and reported periodically, every P=0.05 seconds, though it will be apparent that another period P may be selected.

In addition to monitoring the request arrival rates, the I/O monitor 114 preferably also monitors the time of arrival of each I/O request as the requests are received into the QoS controller 104. In addition, the monitor 114 monitors the completion time for each request reported by the devices 106. From this, the monitor 114 may compute the latency for each request and average latencies for each workload (over time periods of w). The average latencies are then reported to the controller 116. The latency averages are preferably computed and reported periodically, every P=0.05 seconds, though it will be apparent that another period may be selected.

In response to the average latency information, the controller 116 may adjust the target depth of the device queue 118. This control is based on the assumption that reducing the depth of the device queue 118 tends to reduce the latency at the devices 106 but also tends to reduce throughput. Conversely, increasing the depth of the device queue 118 tends to increase latency and also tends to increase throughput. This assumption is expected to be true for most disks and disk arrays.

The controller 116 attempts to maintain the device queue 118 full (i.e. at its target depth). This is because a having many requests in the device queue 118 improves utilization of the devices 106 and, thus, maximizes throughput. However, having too many requests in the device queue 118 tends to result in unacceptable latencies. For example, when a workload demands a low latency, having many requests in the device queue 118 means that a next request from the workload will be competing with many other outstanding requests in the queue 118; therefore, the request will be completed more slowly (with higher latency) than if the queue 118 had fewer outstanding requests. Thus, maintaining the device queue 118 at its target depth tends to maximize utilization of the storage devices 106 without resulting in excessive latency. The target queue depth is adjusted to maintain this balance.

In a particular implementation, the controller 116 compares the current target latencies for each workload to its average latency measured during the prior period for adjusting the target depth of the device queue 118. If any workload has a new target latency that is lower than its prior measured latency, the target depth of the device queue 118 is reduced. The amount of reduction in the target depth is preferably proportional to the largest difference among the workloads between the target latency and the measured latency. For example, in a system with two workloads $W_1$ and $W_2$, if the new target latency for workload $W_1$ is 10% lower than its measured value and the new target latency for workload $W_2$ is 5% lower than its measured value target, the target depth of the device queue 118 is preferably reduced by 10% from the prior target depth for the device queue 118. It will be apparent, however, that the reduction in the target for the device queue 118 can be determined in another manner. For example, the amount of reduction may be statistically determined from the difference between target and measured values for two or more of the workloads (e.g., by averaging). Conversely, if all of the new target latencies are longer than the measured latencies for all of the workloads, the target depth of the device queue 118 may be increased to allow for greater throughput. For example, the target depth may be increased by a predetermined multiplier. For example, where the multiplier is 0.1, target depth is increased to 110% of its prior value, though another multiplier may be selected. Increasing the target depth for the device queue 118 is expected to increase throughput only where the actual queue depth attained was limited by the target depth. Accordingly, whether to increase the target depth may be determined based on whether the queue depth attained was limited by the target depth. If neither of these conditions applies, then the target depth of the device queue 118 may remain unchanged.

Thus, the controller 116 may implement non-linear feedback to adjust the target depth for the device. Formally, the above-described feedback scheme may be represented by the following:

$$E = \min_k \frac{latencyTarget(W_k)}{L(W_k)}$$

$$Q_{new} = \begin{cases} E * Q_{old} & \text{if } E < 1, \\ (1+\varepsilon) Q_{old} & \text{else if } Q_{max} \geq Q_{old}, \\ Q_{old} & \text{otherwise.} \end{cases}$$

where $Q_{new}$ is the new target depth for the device queue 118, $Q_{old}$ is the prior target depth for the device queue 118, $Q_{max}$ is the maximum depth the device queue 118 attained in the prior period, $L(W_k)$ is measured average latency for the workload $W_k$, and $\varepsilon$ is a predetermined small positive value (e.g., 0.1). Initially, the target queue depth is set to an initial value (e.g., 200 entries).

Thus, a quality-of-service system and method for data storage has been described. The invention provides a degree of performance isolation, in which the performance experienced by a workload is less affected by variations in the other workloads, and better ensures that performance objectives are satisfied. By balancing multiple workloads among the storage resources, efficient use is made of the resources.

While the foregoing has been with reference to particular embodiments of the invention, it will be appreciated by those skilled in the art that changes in these embodiments may be made without departing from the principles and spirit of the invention, the scope of which is defined by the appended claims.

What is claimed is:

1. A quality-of-service method for data storage, the method comprising:
   prioritizing a plurality of requests for each of a plurality of workloads;
   selectively forwarding the requests to a queue according to said prioritizing for maintaining the queue at a target queue depth, wherein completed requests are removed from the queue; and
   adjusting the target queue depth in response to a latency statistic for the requests wherein the latency statistic is computed based on a measured difference between an arrival time and a completion time of a plurality of the requests.

2. The method according to claim 1, wherein said prioritizing comprises computing a target deadline for a request.

3. The method according to claim 2, further comprising forwarding any request having a past due target deadline to the queue.

4. The method according to claim 3, wherein said forwarding any request having a past due target deadline is performed even when a queue depth attained exceeds the target queue depth.

5. The method according to claim 2, further comprising monitoring an arrival time of the request.

6. The method according to claim 5, wherein the workload of the request has a target latency and wherein said computing the target deadline for the request comprises combining the target latency of the workload with the arrival time of the request.

7. The method according to claim 6, further comprising monitoring requests of the workload during a time interval for determining a rate of requests for the workload.

8. The method according to claim 7, further comprising adjusting the target latency based on the request rate.

9. The method according to claim 1, wherein the requests are read and write requests directed to a storage device and wherein the queue comprises a device queue included in the storage device.

10. The method according to claim 9, further comprising assigning the requests of each workload to a corresponding input queue prior to said forwarding to the device queue.

11. The method according to claim 9, wherein the device queue has an attained queue depth as of result of said selectively forwarding and further comprising increasing the target queue depth value when the attained queue depth is limited by the target queue depth.

12. The method according to claim 11, wherein said increasing the target queue depth increases the target queue depth by a predetermined multiplier.

13. The method according to claim 1, wherein the computed latency statistic is for a workload having a target latency and wherein said adjusting the target queue depth comprises reducing the target queue depth when the target latency for the workload is less than the computed latency statistic.

14. The method according to claim 13, wherein the target queue depth is reduced proportionally based on comparative values of the target latency and the computed latency statistic.

15. The method according to claim 1, wherein the computed latency statistic is for a workload having a target latency and wherein each workload has a target latency and a computed latency statistic and wherein said adjusting the target queue depth value comprises increasing the target queue depth when each target latency is greater than each computed latency statistic.

16. The method according to claim 1, wherein the latency statistic is computed for each of the plurality of workloads.

17. The method according to claim 16, wherein said adjusting is performed to maintain the computed latency for each workload within the allowable latency statistic for the workload.

18. The method according to claim 17, wherein the target latency statistic is specified by a function such that the target latency for each workload changes depending upon changing characteristics of the workload.

19. A quality-of-service method for data storage comprising:
  receiving a function that specifies an allowable latency statistic for each of a plurality of workloads, the allowable latency statistic specified by the function for each workload changing depending upon changing characteristics of the workload, each workload including a plurality of requests; and
  scheduling and forwarding the requests to a data storage device for substantially maintaining a monitored latency statistic within the allowable latency statistic for each workload, wherein said forwarding is performed for maintaining a target queue depth at the data storage device.

20. The method according to claim 19, wherein said scheduling comprises prioritizing the requests according to a target deadline for each request.

21. The method according to claim 19, further comprising reducing the target queue depth when the allowable latency statistic for the workload is less than the monitored latency statistic.

22. The method according to claim 19, further comprising increasing the target queue depth when each allowable latency statistic is greater than each monitored latency statistic.

23. A quality-of-service apparatus for a storage system comprising:
  a plurality of input queues for receiving requests from a plurality of workloads, wherein each workload is assigned to a corresponding one of the input queues and wherein requests in each input queue are prioritized;
  a monitor for measuring a performance statistic for requests of each workload;
  a scheduler for selectively forwarding the requests from the input queues to a storage device queue, wherein the scheduler selects a highest priority one of the requests for forwarding to the storage device queue according to a target depth of the storage device queue; and
  a controller for adjusting the target depth of the storage device queue according to the performance statistic for the requests of each workload.

24. The apparatus according to claim 23, wherein the requests in each queue are prioritized according to a target deadline assigned to each request.

25. The apparatus according to claim 24, wherein the target deadline for each request is determined from a time of arrival of the request and a target latency for the workload of the request.

26. The apparatus according to claim 24, wherein the monitor monitors a rate of requests for each workload for adjusting the target latency for each workload.

27. The apparatus according to claim 23, wherein the performance statistic for requests of each workload comprises a latency statistic.

28. The apparatus according to claim 27, wherein the controller reduces the target depth when the target latency for each workload is less than the latency statistic for any workload.

29. The apparatus according to claim 28, wherein the target depth is reduced proportionally based on comparative values of the target latency and the latency statistic for the workloads.

30. The apparatus according to claim 27, wherein the controller increases the target depth when each target latency for each workload is greater than the corresponding latency statistic.

31. The apparatus according to claim 27, wherein the device queue has an attained queue depth and wherein the controller increases the target queue depth value when the attained queue depth is limited by the target depth.

32. The apparatus according to claim 31, wherein the target depth is increased by a predetermined multiplier.

33. The apparatus according to claim 31, wherein each workload has one or more corresponding data stores and further comprising a capacity planner for assigning the stores to storage locations.

34. The apparatus according to claim 27, wherein the controller adjusts the target depth of the storage device queue according to the following:

$$E = \min_k \frac{latencyTarget(W_k)}{L(W_k)}$$

$$Q_{new} = \begin{cases} E * Q_{old} & \text{if } E < 1, \\ (1 + \varepsilon) Q_{old} & \text{else if } Q_{max} \geq Q_{old}, \\ Q_{old} & \text{otherwise.} \end{cases}$$

wherein $Q_{new}$ is the adjusted target depth for the storage device queue, $Q_{old}$ is a prior target depth for the storage device queue, $Q_{max}$ is a maximum depth the device queue attained in a prior predetermined period, $L(W_k)$ is the latency statistic for a workload $W_k$, and $\varepsilon$ is a predetermined multiplier.

35. The apparatus according to claim 23, wherein the performance statistic is a latency statistic computed for each of the plurality of workloads.

36. The apparatus according to claim 35, wherein the controller adjusts the target depth of the storage device queue to maintain the computed latency for each workload within the allowable latency statistic for the workload.

37. The apparatus according to claim 36, wherein the target latency statistic is specified by a function such that the target latency for each workload changes depending upon changing characteristics of the workload.

38. A program storage device readable by a machine, tangibly embodying a program of instructions executable by the machine to perform method steps including prioritizing a plurality of requests for each of a plurality of storage system workloads, queuing the requests according to said prioritizing for maintaining a target queue depth, and adjusting the target queue depth in response to a latency statistic for the requests of each workload wherein the latency statistic is computed based on a measured difference between an arrival time and a completion time of the requests of each workload.

39. The program storage device according to claim 38, wherein said prioritizing is performed according to a target deadline assigned to each request determined from a time of arrival of the request and a target latency for the workload of the request.

40. The program storage device according to claim 39, wherein said method steps further include adjusting the target latency for each workload according to a rate of requests for each workload.

* * * * *

UNITED STATES PATENT AND TRADEMARK OFFICE
CERTIFICATE OF CORRECTION

PATENT NO. : 7,917,903 B2  Page 1 of 1
APPLICATION NO. : 10/400556
DATED : March 29, 2011
INVENTOR(S) : Christopher Lumb et al.

It is certified that error appears in the above-identified patent and that said Letters Patent is hereby corrected as shown below:

In column 9, line 18, in Claim 11, delete "as of" and insert -- as a --, therefor.

Signed and Sealed this
Twelfth Day of July, 2011

David J. Kappos
*Director of the United States Patent and Trademark Office*